UNITED STATES PATENT OFFICE.

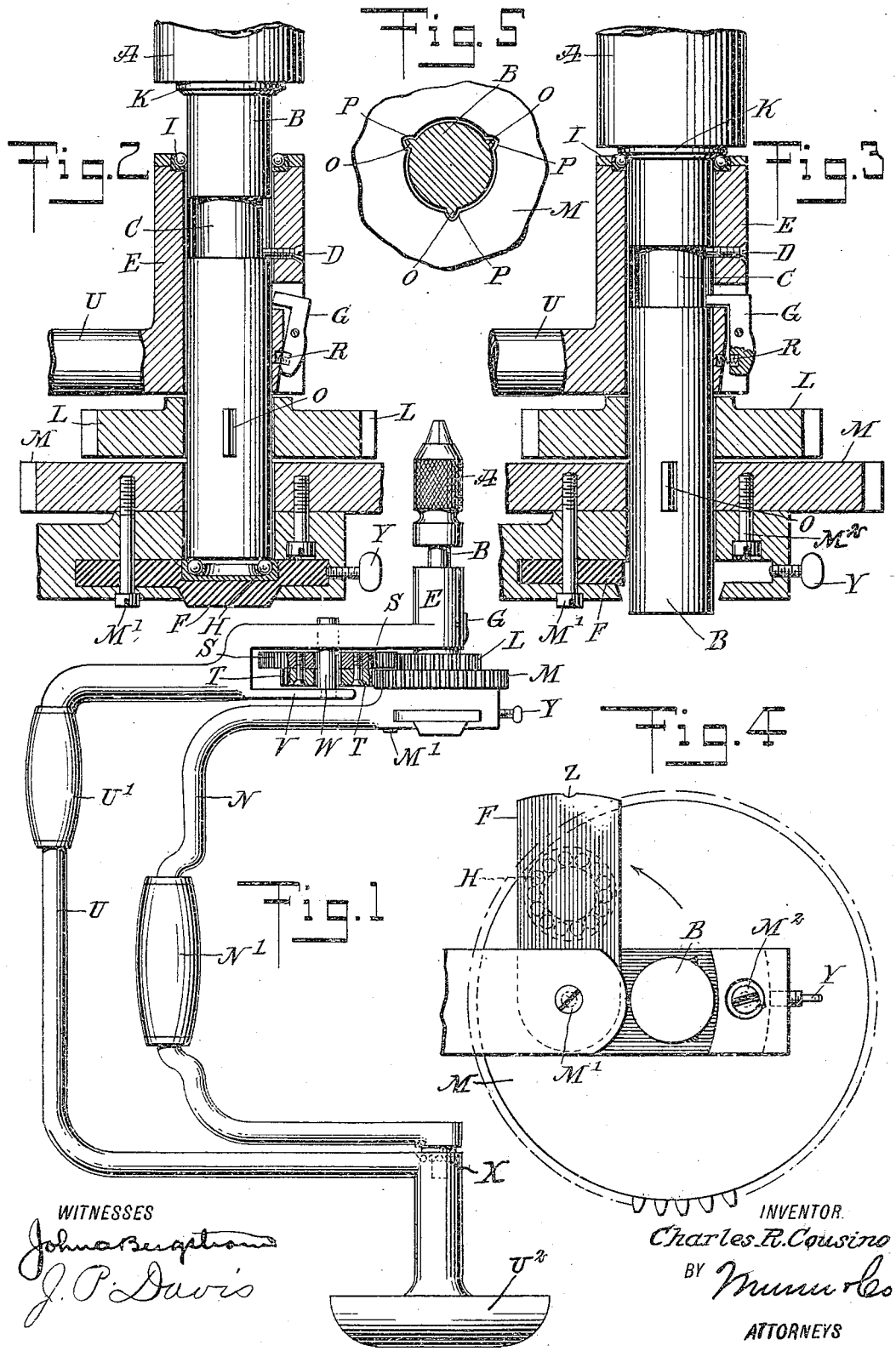

CHARLES ROLLIN COUSINO, OF CRESCENT CITY, CALIFORNIA.

BIT-BRACE.

953,518.       Specification of Letters Patent.       Patented Mar. 29, 1910.

Application filed March 24, 1909. Serial No. 485,449.

*To all whom it may concern:*

Be it known that I, CHARLES R. COUSINO, a citizen of the United States, and resident of Crescent City, in the county of Del Norte and State of California, have invented a certain new and useful Bit-Brace, of which the following is a full, clear, and exact description.

The objects of the present invention are:
to provide an implement which quickly and easily may be converted from a carpenter's brace for use with a bit, to a gear-driven breast drill; and to simplify the construction so that the liability of the disadjustment of the parts is minimized.

Reference is to be had to the accompanying drawings forming a part of this specification, in which similar characters of reference indicate corresponding parts in all the views.

Figure 1 is a side elevation of an implement constructed in accordance with my invention, and shown as in position for use as a gear drill; Fig. 2 is an enlarged detail view, partly in section, of the chuck shaft and coöperative parts, arranged as in position for use as a gear drill; Fig. 3 is a view similar to Fig. 2, showing the same parts as arranged for use as a brace; Fig. 4 is an inverted detail view of the thrust plate and end of the chuck shaft and holding parts, showing the same in the position indicated in Fig. 3; and Fig. 5 is a detail in section, of the chuck shaft, showing the splines or feathers for engagement of the shaft with the gears.

The chuck A, as shown in Fig. 1, is of the construction usually employed for holding machine or twist drills. This chuck may be replaced readily by using any of the well-known types of chucks preferred when using the carpenter tools. In both cases the chuck is secured on the end of the shaft B. This shaft is shaped as shown in Figs. 2 and 3, having a groove C to receive the end of a retaining pin D, which is extended through the wall of the bearing E. The groove C is wide enough to permit considerable longitudinal movement of the shaft B, the pin D resting alternately against the side wall of the groove either at the forward or rear end of the same. In the extended and in the receded position of the shaft B (see Figs. 2 and 3 of the drawings), the shaft is maintained by a plate F and by a latch G respectively. When the shaft is held in its advanced position by the plate F, the pin D is interposed in the path of the rear wall of the groove C to prevent the shaft B falling out of the bearing E. In the receded position of the shaft B, the latch G bears against the rear wall of the groove C while the pin D bears against the forward wall of said groove.

When in its extended position, the end of the shaft B rests on a ball bearing H, mounted in the plate F in a recess provided for that purpose. This bearing may be removed and replaced at will. The bearing H thus disposed, takes the thrust of the shaft B. The thrust of the shaft B, when receded, is taken by the ball bearing I at the forward end of the bearing E. The shaft is provided with a collar K to rest on the bearing I.

In the advanced and in the receded positions above described, the shaft B is engaged by gear wheels L and M respectively. The gear wheel M is fixedly mounted on a crank N, to rotate with the same. The engagement by the wheels L and M, is effected by feathers O, with which the shaft B is provided. These feathers coincide with and engage grooves P in each of the wheels L and M. The shift of the shaft B to cause the feathers O to engage the other of the two wheels, transpires when the grooves P in the two wheels coincide. When the feathers O engage the wheel M, the latter is locked to the shaft B and turns with the crank N. In this position of the shaft B, the latch G is forced by a spring R into the groove C. The implement is in this position ready for use as a brace and is so used.

When the feathers O engage the wheel L, the shaft B rotates with the wheel L which is tooth-engaged by a gear wheel S. The wheel S is fixedly secured to a gear wheel T, which is tooth-engaged with the wheel M. As stated, the wheel M is fixedly mounted on the crank N. When now the said crank is turned to rotate the wheel M, the wheels T and S and the wheel L are rotated, the latter carrying the shaft B. In this position of the shaft relative to the crank N, the implement has become a gear drill. The result to be obtained, that is to increase the rotary action of the shaft B above that of the crank N, or to decrease the action of the said shaft, determines the relative proportion of the wheels M, T, S and L. In the drawings there is shown a type where the speed of rotation imparted to the wheel M, is materially increased in transmitting to the wheel L, whereby the rotation of the shaft B is much faster than that of the crank N. The wheel T is smaller than the wheel M and the wheel L is smaller than the wheel S, each smaller wheel rotating proportionately faster than the larger wheel to which it is tooth-engaged. Should it be desired to produce greater power and slower speed, the order of the arrangement of the wheels would be reversed.

The bearing E is formed in the end of one arm of a handle U, provided with an extension V, to support one end of a short shaft W, provided for the wheels S, T. When it is desired to remove the wheels S and T, the shaft W is drawn from its bearings, when the wheels S and T are disengaged from the handle, and may be replaced by other wheels in different proportion. This would necessitate the change of the wheel L and in some cases the change of the wheel M. The latter-named wheels would be changed by withdrawing the shaft B, by disconnecting the chuck A and withdrawing the shaft B through the rear of the crank N.

The crank N is provided with a hand hold N'. The handle U is provided with a hand hold U' and a pressure head U². By the head U², pressure is applied to the shaft B. The thrust is taken up on the ball bearings I and X when the implement is used as a brace; and by the bearings H and X when the implement is used as a drill.

The plate F is held in its operative position by a set screw Y, to seat which there is provided a nick Z in the said plate.

The wheel M is held fixedly to the crank N by the screws M' and M², the former of which likewise serves as the pivot on which the plate F rotates when moved into and out of its operative position.

Having thus described my invention, I claim as new and desire to secure by Letters Patent:

A bit brace, comprising a chuck shaft having a top to form a bearing and extended lateral projections near the lower end of said shaft to form a bearing; a holding frame; a crank frame; tooth engaged gear wheels interposed between the said chuck shaft and the said crank frame; a thrust plate pivotally mounted on said crank frame and adapted to hold the said chuck shaft in engagement with the said gears and forming a bearing for said shaft; a device to hold the said chuck shaft out of engagement with said gears to operate alternately with said thrust plate; an anti-friction bearing formed on said thrust plate to receive the top of said chuck shaft; and an anti-friction bearing formed on said holding frame and adapted to receive the bearing on the lower end of said chuck shaft to take the thrust of the said chuck shaft; said bearings being arranged to take the thrusts of the said chuck shaft alternately.

In testimony whereof I have signed my name to this specification in the presence of two subscribing witnesses.

CHARLES ROLLIN COUSINO.

Witnesses:
DANIEL ESURNE,
EDWARD J. McGLADE.